(12) United States Patent
Kosik et al.

(10) Patent No.: US 6,183,392 B1
(45) Date of Patent: Feb. 6, 2001

(54) CONTROL OF AN AUTOMATIC CLUTCH

(75) Inventors: Franz Kosik, Ostfildern; Thomas Grass, Urbach, both of (DE)

(73) Assignee: DaimlerChrysler AG, Stuttgart (DE)

( * ) Notice: Under 35 U.S.C. 154(b), the term of this patent shall be extended for 0 days.

(21) Appl. No.: 09/269,280

(22) PCT Filed: Aug. 9, 1997

(86) PCT No.: PCT/DE97/01702

§ 371 Date: Mar. 25, 1999

§ 102(e) Date: Mar. 25, 1999

(87) PCT Pub. No.: WO98/13225

PCT Pub. Date: Apr. 2, 1998

(30) Foreign Application Priority Data

Sep. 25, 1996 (DE) .............................................. 196 39 289

(51) Int. Cl.[7] .................................................. B60K 41/28
(52) U.S. Cl. .............................................. 477/74; 477/171
(58) Field of Search ........................... 477/74, 171, 174; 192/3.61, 3.62, 3.63, 3.57, 221, 13 R

(56) References Cited

U.S. PATENT DOCUMENTS

| | | | |
|---|---|---|---|
| 4,732,248 | 3/1988 | Yoshimura et al. | 477/171 |
| 5,038,901 * | 8/1991 | Parsons et al. | 192/3.63 X |
| 5,099,969 | 3/1992 | Ohtake | 477/86 |
| 5,337,868 | 8/1994 | Liu et al. | 477/74 |
| 5,377,797 * | 1/1995 | Mustapha et al. | 192/3.62 X |
| 5,957,805 * | 9/1999 | Salecker et al. | 477/74 |

FOREIGN PATENT DOCUMENTS

| | | |
|---|---|---|
| 32 00 919 | 7/1983 | (DE) . |
| 35 05 586 | 9/1985 | (DE) . |
| 197 19 614 | 11/1997 | (DE) . |
| 2643596 * | 8/1990 | (FR) . |
| 2 071 803 | 9/1981 | (GB) . |
| 2270143 * | 2/1994 | (GB) . |
| 2318848 * | 6/1998 | (GB) . |

OTHER PUBLICATIONS

*Sachs* entitled "Geared for intelligence".

* cited by examiner

*Primary Examiner*—Charles A Marmor
*Assistant Examiner*—Ankur Parekh
(74) *Attorney, Agent, or Firm*—Evenson, McKeown, Edwards & Lenahan, P.L.L.C.

(57) ABSTRACT

The present invention relates to an automatic clutch intended for an engine-transmission unit in a vehicle with random gear changing. The gearbox comes into action automatically as soon as it has recognized the driver's intentions. Furthermore, the gear lever shift, the speed and the engine torque of the vehicle as well as the brake system action are monitored. As soon as the gear lever has shifted and the speed or the torque has fallen sufficiently and/or the brake system is actuated, the clutch is released.

8 Claims, 1 Drawing Sheet

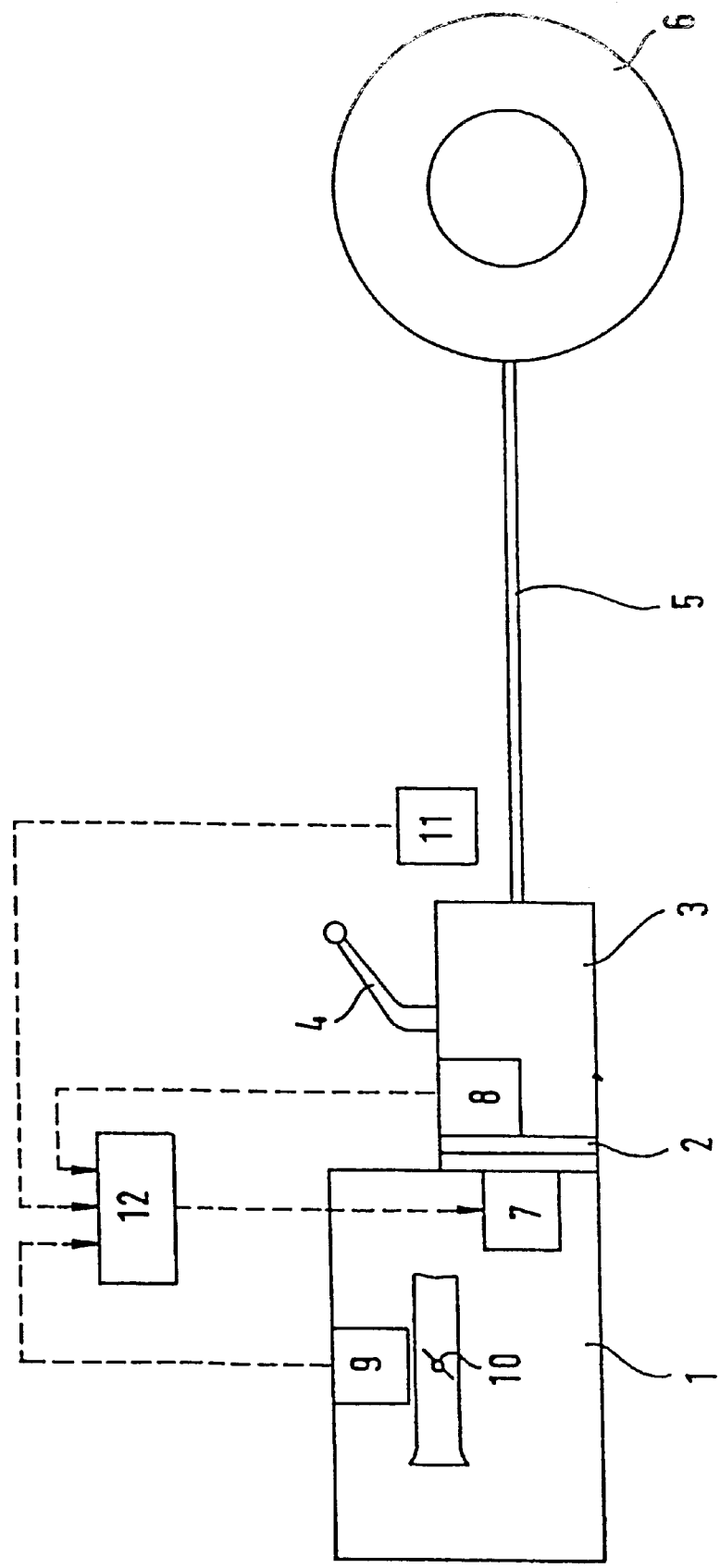

CONTROL OF AN AUTOMATIC CLUTCH

BACKGROUND AND SUMMARY OF THE INVENTION

The invention concerns the control of an automatic clutch in the drive train of a motor vehicle, having an engine controlled by the driver and a transmission shifted by the driver by actuating a lever. A motorized adjusting unit actuates the clutch. A system of sensors, which serves for controlling the adjusting unit, monitors the predetermined parameters and generates a signal for releasing the clutch if criteria are met for when a shift is intended by the driver, i.e. a change of transmission stage intended by the driver. In this arrangement, the system of sensors, in addition to the parameter of movement of the shifting element, also monitors a vehicle brake or its actuating element and a further parameter which can be influenced or controlled by the driver and releases the clutch if the movement of the shifting element or shift lever and the further parameter form a combination of parameters significant for intended shifting.

In motor vehicles having customary internal combustion engines, a transmission must be arranged in the drive train. The transmission allows the transmission ratio between the speed of the vehicle engine and the speed of the drive wheels to be changed according to the respective travelling speed and loading of the vehicle. In the case of customary transmissions, during a change of drive position the power flow between the engine and the drive wheels has to be interrupted by releasing a clutch.

It is known in principle to use automatic clutches for this purpose, i.e. the clutch is automatically released when changing a transmission stage and is subsequently re-engaged, (cf. for example German Patent document DE 35 05 586 A1).

U.S. Pat. No. 5,099,969 describes the problem wherein the speed of the vehicle engine may greatly increase to an undesired degree, i.e. the engine "races", if the automatic clutch is released every time the shifting element or shift lever is actuated. While the vehicle is being driven, the vehicle engine often operates at a higher torque because, to overcome the respective driving resistance, the gas pedal controlling the engine power is actuated with corresponding force. If in such an operating phase the shifting element or the shift lever is inadvertently actuated and this alone causes the clutch to be released, the engine working until then against the higher load can quickly reach extreme speeds on account of the diminishing load when the clutch is released. Therefore, according to U.S. Pat. No. 5,099,969 it is provided that, for clutch control, the torque of the engine or a parameter correlated with it is also monitored. So if there is an engine torque which exceeds a predetermined threshold value when the shifting element or shift lever is actuated, full release of the clutch is prevented. Rather, the transmissible clutch moment is merely reduced, so that the engine still has to work against a certain load. In this way, if the shifting element or shift lever is actuated inadvertently, for example if the shifting element or shift lever is actuated by strong vibration of the vehicle, racing of the engine is prevented.

According to U.S. Pat. No. 5,099,969, it is also envisaged to set the clutch to a limited transmissible moment when the vehicle is maintained stationary by the vehicle brake and the transmission is shifted to a drive position. This achieves the effect that the vehicle immediately tries to creep forward when the vehicle brake is released.

It is also known from German Patent document DE 32 00 919 A1 not to use the movement of the shifting element or shift lever as the sole criterion for intended shifting by the driver. This takes into account that many drivers often place their hand on the shifting element or shift lever without intending to shift the transmission. In such cases, the automatic clutch is to remain engaged as far as possible. For this reason, according to German Patent document DE 32 00 919 A1, it has been envisaged when detecting intended shifting to additionally monitor the torque generated by the engine or a parameter correlated with it, for example the position of the gas pedal or a throttle valve actuated by the latter in the intake system of an internal combustion engine of the vehicle. Intended shifting is only detected and a signal generated for releasing the automatic clutch if, on the one hand, the shifting element or shift lever is moved and, on the other hand, the engine torque lies below a predetermined low threshold value. This threshold value is set such that the gas pedal can virtually no longer be actuated.

The object of the invention is thus to increase reliability in the detection of intended shifting.

This object is achieved according to the invention by releasing the clutch independently of the at least one further parameter if the shifting element and the vehicle brake are actuated simultaneously.

The invention is based on the general idea of making the detection of intended shifting also possible if defects should happen to occur in the engine control or in the sensors or measuring pickups which serve to monitor the torque or the power of the engine. If, for example, the gas pedal should "stick" in the actuated position, the torque or the power of the vehicle engine may very well not fall below a predetermined threshold value. Nevertheless, the clutch is released if the vehicle brake and the lever are actuated. This takes into account the fact that, if there are engine control malfunctions, a driver will keep braking the vehicle and attempt to disengage the respectively selected drive position, at least whenever the engine power remains undesirably high.

Otherwise, with regard to preferred features of the invention, reference is made to the claims and the following explanation of the drawing, on the basis of which a particularly preferred embodiment is described.

BRIEF DESCRIPTION OF THE DRAWING

In the drawing, the single FIGURE shows a schematic representation of a drive train of a motor vehicle as well as the components essential for the clutch control.

DETAILED DESCRIPTION OF THE DRAWING

An internal combustion engine 1 is connected in drive terms via an automatically actuated clutch 2 and a transmission 3. The drive positions or gears of the transmission are changed by manual actuation of a shift lever 4. The transmission is coupled with a drive shaft 5, for example a cardan shaft, in order to drive wheels 6 of a motor vehicle not represented in any more detail.

The actuation of the clutch 2 takes place automatically by means of a motorized adjusting unit 7. For controlling the adjusting unit 7, a system of sensors is provided for monitoring various parameters of the driving operation. This system of sensors comprises a sensor arrangement 8, which is assigned to the transmission 3 or the shift lever 4 and senses the positions and/or movements of the latter. Also provided is a sensor 9 which senses the position of an element which serves to control the power of the engine 1, for example a throttle valve 10 of the air intake system of the engine 1. The throttle valve 10 is actuated in the customary way by the driver by means of a gas pedal, so that, if appropriate, the position of the gas pedal (not shown) can also be sensed instead of the position of the throttle valve 10. Moreover, the sensor 9 may also sense other parameters which are correlated with the power or—in particular—with the torque of the engine 1.

Finally, the system of sensors comprises a signalling device 11, which monitors the actuation of a vehicle brake (not shown in detail). This signalling device 11 may be formed by a brake light switch. The brake light switch is positively actuated upon actuation of the vehicle brake for switching on the brake lights.

The signals of the sensor arrangement 8, of the sensor 9 and of the signalling device 11 are processed by a control circuit 12 of the adjusting unit 7. A signal for releasing the clutch 2 is generated as soon as the sensor arrangement 8 reports a movement of the shift lever 4 and the sensor 9 indicates that the power of the vehicle engine or its torque has fallen below a low threshold value.

Otherwise, a signal for releasing the clutch 2 is also generated whenever—independently of the respective power or the respective torque of the engine 1—a movement of the shift lever 4 is reported by the sensor arrangement 8 and actuation of the vehicle brake is reported by the signalling device 11.

The control circuit 12 also evaluates signals of further sensors (not shown), to be able to engage the clutch 2 optimally when starting or after changing transmission stage.

What is claimed is:

1. An apparatus for controlling an automatic clutch in a drive train of a motor vehicle having an engine controlled by a driver and transmission shifted by the driver by actuating a shifting lever, the apparatus comprising:

an adjusting unit for actuating the clutch;

a system of sensors including a sensor for monitoring a parameter of movement of the shifting lever, a sensor for monitoring vehicle brake actuation, and a sensor for monitoring a further parameter which is influenceable or controllable by the driver, each of the sensors generating an output signal;

said adjusting unit including a control circuit receiving the output signals from the sensors and generating a signal for releasing the clutch;

wherein said control circuit generates the signal for releasing the clutch if the parameter of movement of the shifting lever and the further parameter, in combination, are significant for intended shifting;

wherein said control circuit generates the signal for releasing the clutch independently of the further parameter if the respective sensors indicate simultaneous actuation of the shift lever and the vehicle brake.

2. The apparatus as claimed in claim 1, wherein said further parameter is the position of a power control element of the engine and wherein the parameter of movement of the shifting lever and the position of the power control element of the engine are significant for intended shifting when they simultaneously indicate that the shifting lever is moved and said power control element of the engine is in, or in the vicinity of, an initial position for low engine power.

3. The clutch as claimed in claim 1, wherein said sensor for monitoring brake actuation, is a brake light switch.

4. The clutch as claimed in claim 2, wherein said sensor for monitoring brake actuation, is a brake light switch.

5. A method of controlling an automatic clutch in a drive train of a motor vehicle having an engine and transmission controllable by a driver, the method comprising the acts of:

monitoring a parameter of movement of a shifting lever for the transmission;

monitoring at least one further parameter influenceable by the driver;

releasing the clutch if a combination of said monitored parameters occurs which is significant for an intended shifting;

monitoring a vehicle brake function; and releasing the clutch independently of the at least one further parameter if the shifting lever and the vehicle brake are simultaneously actuated.

6. The method according to claim 5, wherein said at least one further parameter is a position of a power control element of the engine and wherein said combination of the parameter of movement of the shifting lever and the position of the power control element is significant for an intended shifting when the parameters indicate that the shift lever is moved when said power control element of the engine is at least in a vicinity of an initial position corresponding to a low engine power condition.

7. A motor vehicle control apparatus, comprising:

an engine controlled by a driver;

a drive train having an automatic clutch;

a transmission shifted by the driver by actuating a shifting lever;

an adjusting unit for actuating the clutch;

a system of sensors including a sensor for monitoring a parameter of movement of the shifting lever, a sensor for monitoring vehicle brake actuation, and a sensor for monitoring a further parameter which is influenceable or controllable by the driver, each of the sensors generating an output signal;

said adjusting unit including a control circuit receiving the output signals from the sensors and generating a signal for releasing the clutch;

wherein said control circuit generates the signal for releasing the clutch if the parameter of movement of the shifting lever and the further parameter, in combination, are significant for intended shifting;

wherein said control circuit generates the signal for releasing the clutch independently of the further parameter if the respective sensors indicate simultaneous actuation of the shift lever and the vehicle brake.

8. The apparatus as claimed in claim 7, wherein said further parameter is the position of a power control element of the engine and wherein the parameter of movement of the shifting lever and the position of the power control element of the engine are significant for intended shifting when they simultaneously indicate that the shifting lever is moved and said power control element of the engine is in, or in the vicinity of, an initial position for low engine power.

* * * * *